Patented Jan. 5, 1954

2,665,273

UNITED STATES PATENT OFFICE 2,665,273

AZO COMPOUNDS

George W. Mast, South Salem, and Leon E. Tenenbaum, Brooklyn, N. Y., assignors to Nepera Chemical Co., Inc., Yonkers, N. Y., a corporation of New York No Drawing. Application July 19, 1952, Serial No. 299,922

7 Claims. (Cl. 260—154)

This invention relates to certain novel azo compounds and relates more particularly to the preparation of azo compounds suitable for the dyeing of textile materials.

An object of this invention is the production of new azo compounds which may be employed for the dyeing of various textile materials in desirable brown shades.

Another object of this invention is the preparation of azo compounds which are fast to light, resistant to acid fading and which do not bleed from materials dyed therewith.

Other objects of this invention will appear from the following detailed description.

Azo dyestuffs have been found to be well suited to the dyeing of many textile materials. Many of these dyestuffs, however, are not fast to light or to acid fumes and others tend to bleed off when materials dyed with said dyestuffs are placed in contact with white materials, even for a short time and sometimes even in a dry state. While some azo dyestuffs are better in some respects than others, few are entirely free of all of these undesirable characteristics.

We have found that azo dyestuffs dyeing cotton, rayon, cellulose acetate and other textile materials in desirable brown shades fast to light, washing and acid fading, may be obtained by diazotizing a sulfadiazine compound of the formula

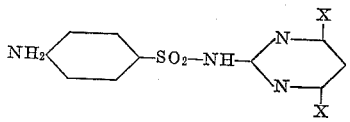

wherein X is a member of the group consisting of hydrogen and methyl and coupling said diazotized compound with salicylic acid, gentisic acid, p-amino salicylic acid, etc. The azo compounds obtained may be represented by the formula

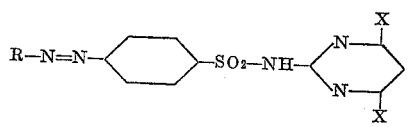

wherein R is a hydroxy-substituted phenyl carboxylic acid, and X has the meaning above. The azo compounds which may be obtained in accordance with our invention are, for example, gentisyl-azo-sulfadiazine, salicyl-azo sulfadiazine, p-amino-salicyl-azo-sulfadiazine, gentisyl-azo-sulfamerazine, gentisylazo-sulfamethazine, salicyl - azo - sulfamerazine, salicyl-azo-sulfamethazine, p-amino-salicyl-azo-sulfamethazine and p-amino-salicyl-azo-sulfamerazine.

The dyestuffs may be formed in substance and the material dyed from a dyebath containing the azo dyestuff dispersed therein by means of a suitable detergent or dispersing agent. Alternatively, the material to be dyed may be based with the sulfadiazine compound and the diazotization and coupling carried out on the material itself.

In order to further illustrate our invention, but without being limited thereto, the following examples are given:

Example I 50 parts by weight of sulfadiazine are dissolved in a mixture of 59 parts by weight of concentrated hydrochloric acid and 25 parts by weight of water and the sulfadiazine diazotized with an aqueous solution of 13.8 parts by weight of sodium nitrite in water. The suspension of diazonium compound is added to a solution containing 31 parts by weight of p-amino-salicylic acid, 24 parts by weight of potassium hydroxide and 12 parts by weight of sodium carbonate maintained at 0-5° C. The reaction mixture is maintained alkaline by the addition of further potassium hydroxide to keep the compound in solution. The reaction mixture is then maintained at room temperature for about 48 hours after which it is heated to 50° C. for about one hour. The p-amino-salicyl-azosulfadiazine is precipitated out of solution by acidifying the latter to a pH of 5.0. This compound decomposes about 250° C. and dyes cotton materials in an attractive cocoa brown shade from an aqueous dispersion of said azo compound.

Example II 50 parts by weight of sulfadiazine are dissolved in a mixture of 59 parts by weight of concentrated hydrochloric acid and 25 parts by weight of water and the sulfadiazine diazotized with an aqueous solution of 13.8 parts by weight of sodium nitrite in water. The suspension of diazonium compound is added to a solution containing 31 parts by weight of gentisic acid, 24 parts by weight of potassium hydroxide and 12 parts by weight of sodium carbonate maintained at 0-5° C. The reaction mixture is maintained alkaline by the addition of further potassium hydroxide to keep the compound in solution. The reaction mixture is then maintained at room temperature for about 48 hours after which it is heated to 50° C. for about one hour. The gentisyl-azo-sulfadiazine is precipitated out of solution by acidifying the latter to a pH of 5.0. This compound decomposes at about 250° C. and dyes cotton materials in an attractive cocoa brown shade from an aqueous dispersion of said azo compound.

*Example III*

50 parts by weight of sulfadiazine are dissolved in a mixture of 59 parts by weight of concentrated hydrochloric acid and 25 parts by weight of water and the sulfadiazine diazotized with an aqueous solution of 13.8 parts by weight of sodium nitrite in water. The suspension of diazonium compound is added to a solution containing 31 parts by weight of salicylic acid, 24 parts by weight of potassium hydroxide and 12 parts by weight of sodium carbonate maintained at 0–5° C. The reaction mixture is maintained alkaline by the addition of further potassium hydroxide to keep the compound in solution. The reaction mixture is then maintained at room temperature for about 48 hours after which it is heated to 50° C. for about one hour. The salicyl-azo-sulfadiazine is precipitated out of solution by acidifying the latter to a pH of 5.0. This compound decomposes at about 250° C. and dyes cotton materials in an attractive cocoa brown shade from an aqueous dispersion of said azo compound.

Similarly, sulfamethazine and sulfamerazine may be diazotized and coupled with salicylic acid, gentisic acid and p-amino-salicylic acid to yield the corresponding diazo compounds as mentioned above.

It is to be understood that the foregoing detailed description is given merely by way of illustration and that many variations may be made therein without departing from the spirit of our invention.

Having described our invention, what we desire to secure by Letters Patent is:

1. Azo compounds of the formula

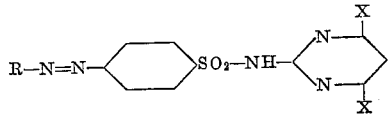

wherein R is a hydroxy-substituted phenyl carboxylic acid and X is a member of the group consisting of hydrogen and methyl.

2. Azo compounds of the formula

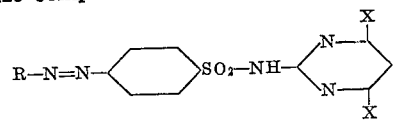

wherein R is a hydroxy-substituted phenyl carboxylic acid which is further substituted by an amino group and X is a member of the group consisting of hydrogen and methyl.

3. The azo compound

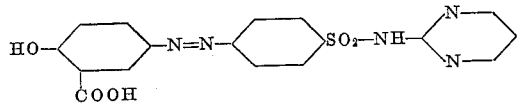

4. The azo compound

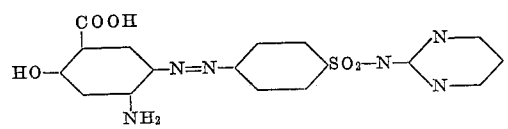

5. The azo compound

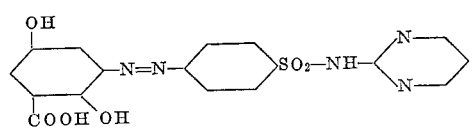

6. The azo compound

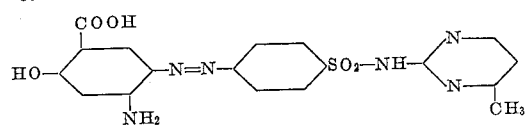

7. The azo compound

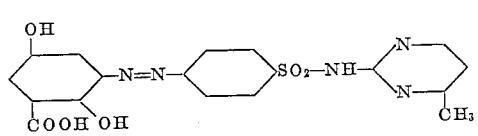

GEORGE W. MAST.
LEON E. TENENBAUM.

References Cited in the file of this patent

UNITED STATES PATENTS

| Number | Name | Date |
| --- | --- | --- |
| 2,307,650 | Tisza et al. | Jan. 5, 1943 |
| 2,396,145 | Askelof et al. | Mar. 5, 1946 |
| 2,410,793 | Winnek et al. | Nov. 5, 1946 |